US011383965B1

(12) United States Patent
Springer et al.

(10) Patent No.: US 11,383,965 B1
(45) Date of Patent: Jul. 12, 2022

(54) VALVE CURRENT ERROR DETECTION FOR FLUID MIXTURE DISPENSING DEVICE

(71) Applicant: Cana Technology, Inc., Redwood City, CA (US)

(72) Inventors: Gregory Allen Springer, Los Altos, CA (US); Sean McCommons, San Francisco, CA (US); Jeffery Lance Kizer, Redwood City, CA (US); Matthew Ambauen, San Francisco, CA (US); Stephan Weidi Tai, San Francisco, CA (US); Erik James Shahoian, Sonoma, CA (US); David Friedberg, San Francisco, CA (US); Andrés Ornelas Vargas, San Francisco, CA (US); Simon Spence, Hawthorn (AU); Peter Delmenico, Hampton (AU); Andrew Christopher Jenkins, West Heidelberg (AU); Nathan Andrew Ray, Heathmont (AU)

(73) Assignee: Cana Technology, Inc., Redwood City, CA (US)

(*) Notice: Subject to any disclaimer, the term of this patent is extended or adjusted under 35 U.S.C. 154(b) by 0 days.

(21) Appl. No.: 17/547,716

(22) Filed: Dec. 10, 2021

Related U.S. Application Data

(60) Provisional application No. 63/146,461, filed on Feb. 5, 2021.

(51) Int. Cl.
*B67D 1/08* (2006.01)
*B67D 1/00* (2006.01)
(Continued)

(52) U.S. Cl.
CPC ............ *B67D 1/0878* (2013.01); *A47J 31/40* (2013.01); *A47J 31/461* (2018.08);
(Continued)

(58) Field of Classification Search
CPC .. B67D 1/0878; B67D 1/0037; B67D 1/0085; B67D 1/0888
See application file for complete search history.

(56) References Cited

U.S. PATENT DOCUMENTS 4,582,223 A 4/1986 Kobe
5,757,667 A 5/1998 Shannon et al.
(Continued)

FOREIGN PATENT DOCUMENTS

CN 109917205 A 6/2019
EP 2119610 B1 12/2014
(Continued)

OTHER PUBLICATIONS

International Search Report and Written Opinion dated Apr. 12, 2022 from International Application No. PCT/US2022/012009 filed Jan. 11, 2022, 15 pages.

*Primary Examiner* — Jeremy Carroll
(74) *Attorney, Agent, or Firm* — Daylight Law, P.C.

(57) ABSTRACT

Ingredient dispensing systems and methods are disclosed. A disclosed system includes an ingredient reservoir and an electromechanical valve configured so that, when the electromechanical valve is activated, an ingredient is dispensed from the ingredient reservoir. The disclosed system also includes a current sensor configured to measure a current draw of the electromechanical valve. The disclosed system also includes a controller programmed to sample the current draw from the current sensor and to detect a dispense error of the electromechanical valve based on the sampled current draw.

32 Claims, 6 Drawing Sheets

(51) Int. Cl.
*A47J 31/52* (2006.01)
*F16K 37/00* (2006.01)
*A47J 31/40* (2006.01)
*A47J 31/46* (2006.01)

(52) U.S. Cl.
CPC ........ *A47J 31/5251* (2018.08); *B67D 1/0037* (2013.01); *B67D 1/0085* (2013.01); *B67D 1/0888* (2013.01); *F16K 37/0041* (2013.01)

(56) References Cited

U.S. PATENT DOCUMENTS

| | | | |
|---|---|---|---|
| 7,405,917 B2 | 7/2008 | Ahrens et al. | |
| 10,874,246 B2 * | 12/2020 | Burrows | A47J 31/469 |
| 11,028,941 B2 | 6/2021 | Ferreira et al. | |
| 11,148,927 B2 * | 10/2021 | Wing | B67D 1/16 |
| 11,230,467 B2 * | 1/2022 | Prochaska | B67D 1/0085 |
| 2011/0214741 A1 | 9/2011 | Fukano et al. | |
| 2013/0027046 A1 | 1/2013 | Leif | |
| 2013/0292407 A1 * | 11/2013 | Beavis | F04B 49/065 222/23 |
| 2014/0107835 A1 * | 4/2014 | Biasi | B67D 1/0036 700/231 |
| 2017/0234920 A1 | 8/2017 | Nair et al. | |
| 2021/0190101 A1 | 6/2021 | Hogan | |

FOREIGN PATENT DOCUMENTS

| | | |
|---|---|---|
| JP | 2000032622 A | 1/2000 |
| JP | 2001193507 A | 7/2001 |
| KR | 20080023875 A | 3/2008 |
| WO | 0183360 A2 | 11/2001 |
| WO | 2021115634 A3 | 7/2021 |

* cited by examiner

VALVE CURRENT ERROR DETECTION FOR FLUID MIXTURE DISPENSING DEVICE

CROSS REFERENCE TO RELATED APPLICATIONS

This application claims the benefit of U.S. Provisional Patent Application No. 63/146,461 filed Feb. 5, 2021, which is incorporated by reference herein in its entirety for all purposes.

BACKGROUND

Typical beverage dispensing systems combine a diluent (e.g., water) with a basic beverage component such as concentrates or syrups made up of a multitude of other ingredients. However, these basic beverage components often require significant storage space and may even need to be kept refrigerated to protect against spoilage. Accordingly, these basic beverage components are most likely not even stored in the same room as the beverage dispensing system, much less in the beverage dispensing system itself. In addition, each individual beverage may require its own unique basic beverage component thereby further increasing storage space and the overall footprint of the beverage dispensing system. Furthermore, typical beverage dispensing systems cannot allow for customization of the beverage as well as household usage.

SUMMARY

This disclosure relates generally to fluid mixture dispensing systems and methods, and more specifically, to error detection mechanisms for ingredient dispensing systems.

Fluid mixture dispensing can be accomplished by an automated fluid mixture dispensing system. Such system can generate mixtures of beverages, cleaning products, cosmetic compounds, and various other fluid mixtures. Based on a user selection that is custom tailored by them, the system can prepare and dispense a variety of fluid mixtures, based on a set of basic mixtures and compounds. The system can rely on the predefined chemical makeup of the fluid mixture in order for the system to prepare the mixture. For example, chemical analysis of a specific wine or perfume results in a list of chemical ingredients or components that make up the specific wine or perfume. The systems disclosed herein can rely on that predetermined list of chemical ingredients for a specific final, user specified fluid mixture (e.g., chardonnay) to prepare that fluid mixture. Some chemical ingredients may be dispensed in the final mixture with relatively large volume percentages (e.g., a glass of wine may have about 10-15% ethanol), whereas other components may be dispensed in volume of less than 0.1 mL. Because a small quantity (e.g., less than 0.1 mL) of an individual chemical ingredient can have a large effect on a fluid mixture property (e.g., taste), the overall storage or footprint of the system can be significantly smaller than those dispensing system which rely on syrups and/or concentrates.

FIG. 1 illustrates an example of a fluid mixture dispensing system in the form of a device 100, in accordance with specific embodiments of the invention. In some embodiments, the fluid mixture dispensing device 100 can be used for beverage dispensing as well as a wide variety of other fluid mixture dispensing. The fluid mixture dispensing device 100 can be a countertop or consumer electronic device or a larger device installed in a restaurant or other commercial business. Fluid mixture dispensing device 100 can include a casing 102. The casing can be a protective outer casing that houses various internal components of the system, such as the components illustrated in FIG. 2. Fluid mixture dispensing system 100 can also include a user interface 103 so that a user can control the device. For example, a user can select a beverage to be made by device 100 via the user interface 103. Fluid mixture dispensing system 100 can also include one or more controllers configured to execute instructions to control the various components of the device and to cause the device to perform the functions described in this disclosure.

FIG. 2 illustrates examples of various internal components of a fluid mixture dispensing device, such as device 100, that can be housed by casing 102. View 200 is a front-left view of the device and view 250 is a back-right view of the device. These internal components can include solvent reservoir(s) (e.g., water reservoir(s) and/or alcohol reservoir(s)) such as solvent reservoirs 108a and 108b, ingredient reservoirs such as ingredient reservoirs 106, a cartridge for the ingredient reservoirs, such as cartridge 105, mixing channels, mixing chambers, heat exchangers (e.g., heaters/chillers), and/or dissolution chamber(s) as well as various fluid moving mechanisms (e.g., valves, actuators, pumps, etc.).

The internal components of the device 100 can also include a set of valves, such as valve 120, associated to the ingredient reservoirs 106. A set of ingredient reservoirs 106 have been removed over the exposed valves 120 in the left portion of FIG. 2. The valves can be configured to fluidly connect the ingredient reservoirs 106 in cartridge 105 to a mixing area of the device 100, where one or more ingredients from ingredient reservoirs 106 and/or one or more solvents from solvent reservoirs 108a and 108b can be mixed to form an intermediate mixture. The intermediate mixture can then flow to a mixing chamber of the device where the final fluid mixture can be further mixed and dispensed out of the device.

In specific embodiments of the invention, the valves (e.g., valve 120) can be electromechanical valves which require power to be operated. The valves system can include one or more current sensors configured to measure a current draw of the valves. The measurements form the sensor(s) can be sampled by a controller of the system to detect various events. For example, the measurements from the current sensors could be used to detect if a valve is in an open or closed state. Specific embodiments of the invention disclose mechanisms to detect not only the binary states of the valves (open/close) but also an unexpected behavior of the valves using the current measurements. In specific embodiments of the invention, the measurements from the current sensor are further used to determine a type of error. The detection of the error and determination of the type of error can be made by comparing the measurements from the current sensors to reference values for the expected behavior of the valves.

In specific embodiments of the invention, an ingredient dispensing system is provided. The system includes an ingredient reservoir, an electromechanical valve configured so that, when the electromechanical valve is actuated, an ingredient is dispensed from the ingredient reservoir. The system also includes a current sensor configured to measure a current draw of the electromechanical valve, and a controller configured to sample the current draw from the current sensor and detect a dispense error of the electromechanical valve based on the sampled current draw.

In specific embodiments of the invention, a method conducted by an ingredient dispensing system is provided. The method includes dispensing, by an electromechanical valve, an ingredient from an ingredient reservoir. The method also includes measuring, using a current sensor, a current draw of the electromechanical valve. The method also includes sampling, by a controller, the current draw from the current sensor. The method also includes detecting, by the controller, a dispense error of the electromechanical valve based on the sampled current draw.

In specific embodiments of the invention, an ingredient dispensing system is provided. The ingredient dispensing system includes an ingredient reservoir, an electromechanical valve for the ingredient reservoir, a current sensor configured to measure a current draw of the electromechanical valve, and a controller. The controller is programmed to actuate the electromechanical valve to dispense an ingredient from the ingredient reservoir, sample the current draw from the current sensor, and detect a dispense error of the electromechanical valve based on the sampled current draw.

BRIEF DESCRIPTION OF THE DRAWINGS

In the Figures, like reference numbers correspond to like components unless otherwise stated.

DETAILED DESCRIPTION

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Figure 1:
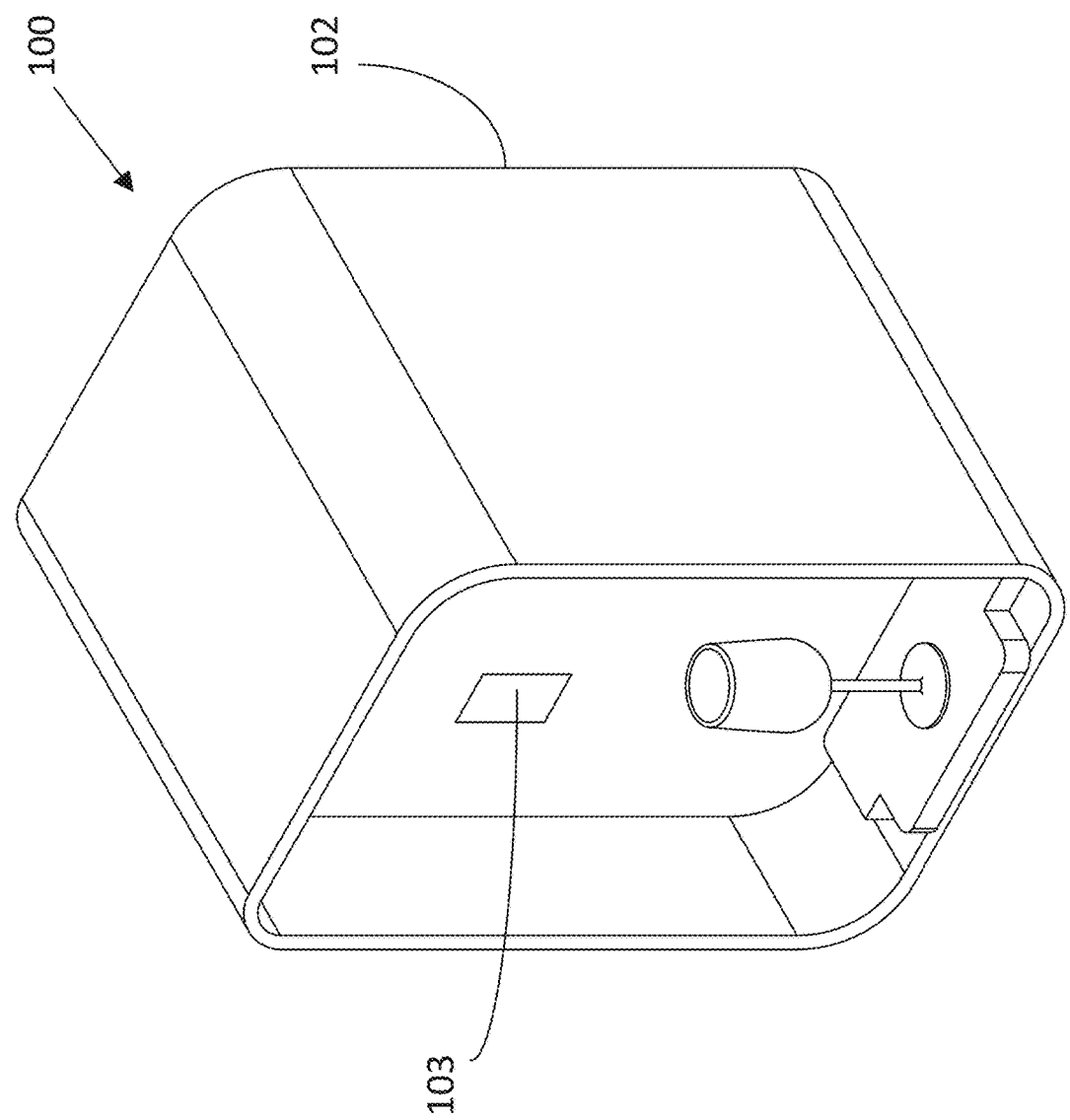
FIG. 1 illustrates an example of a fluid mixture dispensing system, in accordance with specific embodiments of the invention disclosed herein.

Different components and methods for a fluid mixture dispensing system such as device 100 illustrated in FIG. 1 and FIG. 2 will be described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

As illustrated with reference to FIG. 2, the fluid mixture dispensing device 100 can include one or more ingredient reservoirs, such as ingredient reservoir 106. The ingredient reservoirs can be any of the ingredient reservoirs described in U.S. Provisional Patent Application No. 63/146,461 filed Feb. 5, 2021, U.S. patent application Ser. No. 17/547,081 filed Dec. 9, 2021, and U.S. patent application Ser. No. 17/545,699 filed Dec. 8, 2021, all of which are incorporated by reference herein in their entirety for all purposes.

An ingredient reservoir can include an "ingredient" also referred to herein as an "ingredient mixture". An ingredient mixture can include at least one primary/functional ingredient. A primary/functional ingredient can be at least one of a solid, liquid, or a gas. An example of a primary/functional ingredient can be chemical compounds.

In some embodiments, the ingredient mixture can include various concentrations of chemical compounds. In some embodiments, an ingredient mixture can include at least one solvent. The at least one solvent can be any combination of solvents disclosed herein. For example, an ingredient mixture in an ingredient reservoir can be a mixture of citric acid (primary/functional ingredient) and water at a particular concentration. Another ingredient mixture can be a mixture of potassium sulfate (primary/functional ingredient), water, and ethanol. As discussed herein, these ingredients/ingredient mixtures can get dispensed into a fluid stream (which could be a mixture in itself of solvent (e.g., water and/or ethanol)) and combined together to form an intermediate fluid mixture. In some embodiments, an ingredient mixture can also include at least one of a solvent (e.g., water and/or an alcohol) and an additive ingredient. An additive ingredient can be at least one of a surfactant, preservative, or an emulsifier/stabilizer.

Ingredient or ingredient mixtures can be stored in ingredient reservoirs, such as ingredient reservoir 106. In some embodiments, the ingredient reservoirs can include bladder bags, syringes, gravity dispense chambers, pellet dispenser, and/or pierceable volumes. In some embodiments, the ingredient reservoirs can be the same, vary, or a combination thereof in the system. In some embodiments, the fluid mixture dispensing system can include a plurality of ingredient reservoirs.

In some embodiments, in response to receiving a request for a fluid mixture, the system can flow a predetermined amount of at least one ingredient from a plurality of ingredient reservoirs to at least one mixing channel to form an intermediate fluid mixture. The device can include multiple mixing channels. The term mixing area will be used in this disclosure to refer to any area in which an intermediate fluid mixture is mixed including, for example one or more mixing channels in which one or more ingredients are mixed with one or more solvents. The predetermined amount of the at least one ingredient can be mixed with at least one solvent (e.g., water from a water reservoir and/or alcohol from an alcohol reservoir) in the at least one mixing channel before flowing to a mixing chamber. The at least one solvent can dissolve the at least one ingredient and/or carry the at least one ingredient to the mixing chamber.

In some embodiments, in response to receiving a request for a fluid mixture, the system can flow a predetermined amount of at least one ingredient from at least one ingredient reservoir to other parts of the system, such as the mixing chamber, or to at least one dissolution chamber to form an intermediate mixture. In some embodiments, the at least one ingredient reservoir that is configured to flow an ingredient directly to the mixing chamber and/or dissolution chambers may not be one of the ingredient reservoirs that is fluidly connected to the at least one mixing channel.

In some embodiments, the predetermined amounts of the ingredient(s) can be specific to the requested fluid mixture. In other words, the predetermined amounts of the ingredient(s) that is flowed to the mixing chamber whether it be flowed directly there or in an intermediate mixture or mixtures from a mixing area can correspond to the amount of the ingredient(s) in a predefined fluid mixture, for example a fluid mixture selected form a library of predefined fluid mixtures.

In some embodiments, a predetermined amount of an ingredient from an ingredient reservoir can be dispensed via at least one microfluidic pump into a mixing area including at least one mixing channel, or into the mixing chamber, and/or at least one dissolution chamber. In some embodiments, every ingredient reservoir can be fluidly connected to a microfluidic pump for dispensing an ingredient in an ingredient reservoir to a mixing channel, the mixing chamber, and/or at least one dissolution chamber. In some embodiments, multiple ingredient reservoirs can be fluidly connected to a microfluidic pump for dispensing ingredients from the ingredient reservoirs.

The ingredient reservoirs can be provided in one or more cartridges, such as cartridge 105 illustrated with reference to FIG. 2. The cartridge can include a pressurized chamber to keep the ingredient reservoirs under pressure and facilitate dispense of such ingredients. The cartridge can be any of the cartridges described in U.S. Provisional Patent Application No. 63/146,461 filed Feb. 5, 2021, U.S. patent application Ser. No. 17/547,081 filed Dec. 9, 2021, U.S. patent application Ser. No. 17/547,612 filed Dec. 10, 2021 and U.S. patent application Ser. No. 17/545,699 filed Dec. 8, 2021, all of which are incorporated by reference herein in their entirety for all purposes.

Figure 2:
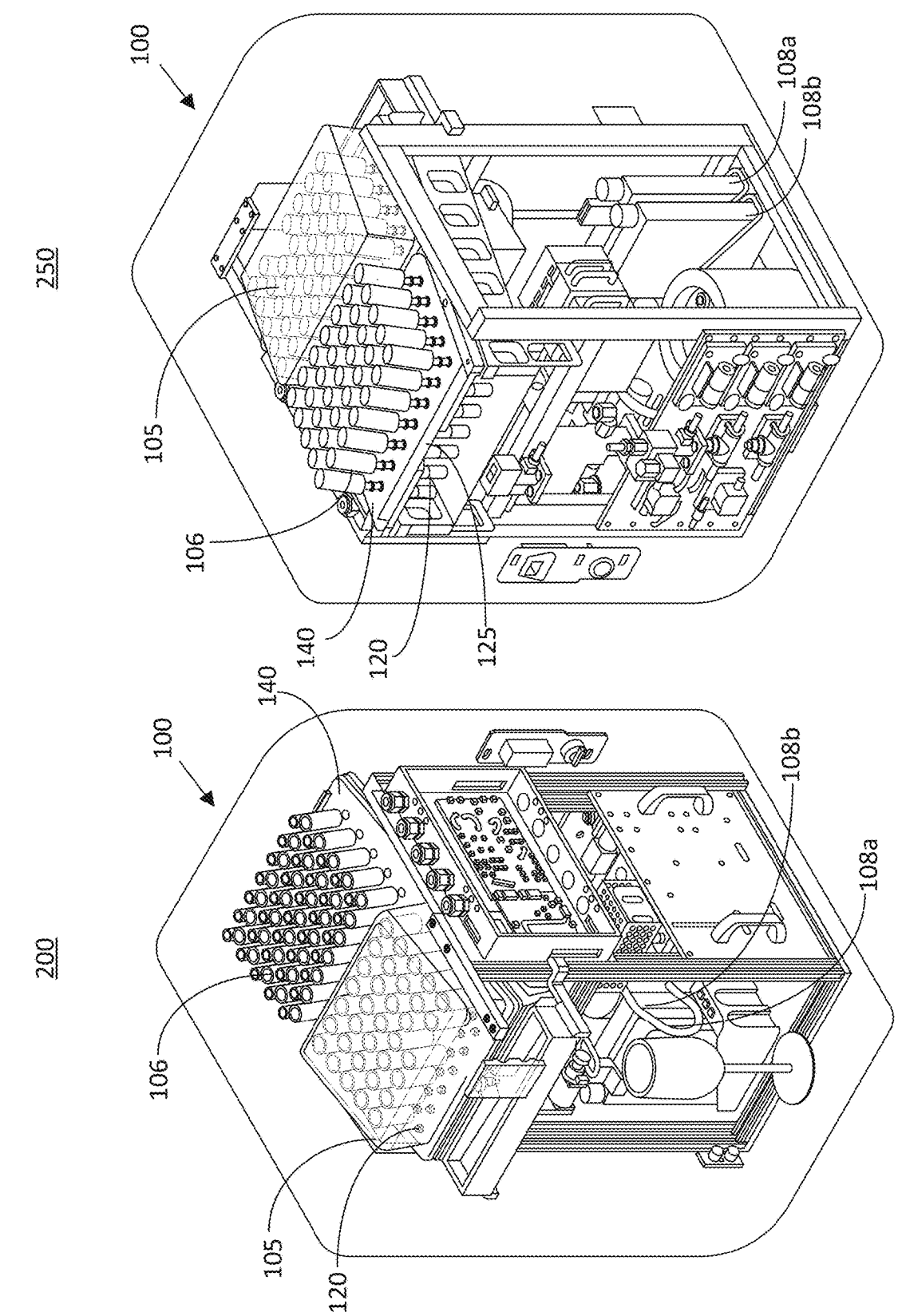
FIG. 2 illustrates examples of various internal components of the fluid mixture dispensing device, in accordance with some embodiments disclosed herein.

FIG. 2 shows the set of ingredient reservoirs, such as ingredient reservoirs 106, packaged in the ingredient cartridge 105. In some embodiments, the system can include one or more ingredient cartridges. For example, at least one of 0-N solid ingredient cartridges, 0-N gaseous ingredient cartridges, 0-N multi-ingredient cartridges, and 0-N liquid ingredient cartridges. In some embodiments, an ingredient cartridge 105 can include a plurality of ingredient reservoirs 106.

In some embodiments, at least one cartridge can be configured to dispense a predetermined amount of the at least one ingredient from at least one ingredient reservoir to a mixing area (including one or more mixing channels), the mixing chamber, and/or at least one dissolution chamber. In some embodiments, the at least one cartridge can be removably attached from the fluid mixture dispensing system so that it can be replaced, serviced (ingredients refilled/replaced) and recyclable. In some embodiments, the fluid mixture dispensing system can still operate with a cartridge missing or empty.

In some embodiments, a predetermined amount of at least one ingredient can be dispensed via at least one valve, such as valve 120, into the mixing area, the mixing chamber, and/or at least one dissolution chamber. The valves, such as valve 120, can be electromechanical valves, and include an actuator. The actuators can be solenoids and the valves can generally be called solenoid valves. In some embodiments, each ingredient reservoir can have an individual valve with an individual associated actuator. In some other embodiments, more than one ingredient reservoir can be associated to the same valve and/or actuator. In some embodiments, each valve can be configured to control the flow of an ingredient from an ingredient reservoir to the mixing area, the mixing chamber, and/or at least one dissolution chamber.

In some embodiments, the at least one cartridge, such as cartridge 105, can include a pressurized chamber inside the cartridge. In specific embodiments, the pressurized chamber can be formed by the cartridge itself. This pressurized chamber can house the plurality of ingredient reservoirs, such as ingredient reservoir 106, such that a pressure can be applied to the ingredient reservoirs. In some embodiments, the system (e.g., a controller, a pressure regulator, or other elements as will be described below in more detail) can be configured to control the pressure of the pressurized chamber. Accordingly, the cartridge can be pressurized such that when the valve of an ingredient reservoir is opened (e.g. valve 120 for ingredient reservoir 106), the ingredient stored in that ingredient reservoir can flow out of the ingredient reservoir towards a mixing channel, the mixing chamber, and/or at least one dissolution chamber. The ingredient reservoirs can be loaded into or attached to the pressurized chamber with a controlled pressure for providing an expulsion force.

The mixing area (including one or more mixing channels), the mixing chamber, and/or at least one dissolution chamber can be fluidly connected to the valve outputs of the ingredient reservoirs such that any valve opening can result in an ingredient flowing to a mixing area (including one or more mixing channels), the mixing chamber, and/or at least one dissolution chamber. In some embodiments, the controller can be configured to open at least one valve for a time based on at least the pressure of the pressurized chamber, the physical flow characteristics of the specific ingredient in the ingredient reservoir, and/or the diameter of the at least one valve opening to control the flow of the predetermined amount of the at least one ingredient to be dispensed. Accordingly, for a specific ingredient in an ingredient reservoir, the system can be calibrated to dispense/flow a predetermined amount of the specific ingredient to a mixing area (including one or more mixing channels), the mixing chamber, and/or at least one dissolution chamber based on the pressure of the pressurized chamber, the physical flow characteristics (e.g., viscosity) of the specific ingredient in the ingredient reservoir, and/or the diameter of the valve opening (or diameter of orifice as explained below). As such, the time interval that the at least one valve is open can proportionally correspond to amounts/concentrations of at least one ingredient of a list of ingredients of a predefined fluid mixture (from a chemical analysis). Dispensing an expected amount of an ingredient, as controlled by the time the valve is open, using the approaches disclosed in this paragraph is referred to in this disclosure as a time-based ingredient dispensing method.

In some embodiments, the ingredients stored in the ingredient reservoirs (e.g., 106) can be ported to the valves (e.g., 120) beneath the ingredient reservoir. In some embodiments, the ingredient reservoirs (and their valves) can open to a mixing area. In some embodiments, a plurality of ingredient reservoirs can be fluidly connected to the mixing area including a single mixing channel. In some embodiments, a mixing channel can be fluidly connected to a plurality of mixing channels and a second mixing channel can be fluidly connected to a second plurality of mixing channels. For example, a first mixing channel may have 5-20 ingredient reservoirs fluidly connected to it and a second mixing channel may have 5-20 of the same or different ingredient reservoirs fluidly connected to the second mixing channel. In those embodiments, the mixing area can include the plurality of mixing channels. Accordingly, at least one solvent (e.g., water and/or ethanol) can flow through the mixing area and collect any ingredient dispensed into the mixing channels. In some embodiments, at least one solvent can also be dispensed into the mixing area in order to remove any leftover ingredients.

In some embodiments, the mixing channel(s) can be formed into the bottom of a plate, such as plate 140 illustrated in FIG. 2. All the mixing channels can be fluidly connected to the solvent reservoir(s) and the mixing chamber. As such, solvent can enter at least one mixing channel and at least one ingredient from at least one mixing reservoir can flow into the mixing channel to form an intermediate mixture with the solvent.

In specific embodiments of the invention, the solvents used can be water, alcohol, ethyl lactate, and/or propylene glycol. At least one solvent reservoir can supply at least one solvent to the fluid mixture to be dispensed. For example, at least one solvent reservoir 108*a* is shown in FIG. 2 and can be, for example, a water reservoir. In some embodiments, the fluid mixture dispensing system can include a plurality of solvent reservoirs (e.g., one or multiple water reservoirs, one or multiple alcohol reservoirs, one or multiple propylene glycol reservoirs, one or multiple ethyl lactate reservoirs, and/or mix of alcohol and water reservoirs, among other variations). In some embodiments, any water reservoir(s) can include a water filter such that the water filter can remove impurities from the water in the water reservoir(s) prior to flowing the water to the other parts of the system (e.g., mixing chamber).

The at least one solvent reservoir can supply solvent to the fluid mixture to be dispensed. For example, any water reservoir can supply water to the fluid mixture to be dispensed. In some embodiments, a solvent reservoir is a solvent container housed within the fluid mixture dispensing system to supply solvent(s) to the system. The solvent(s) can be used to dissolve or carry various other ingredients to form the requested fluid mixture. In some embodiments, in response to receiving the request for a fluid mixture, the system (e.g., a controller of the system) can flow a predetermined amount of at least one solvent from at least one solvent reservoir to at least one mixing channel to form an intermediate fluid mixture.

In some embodiments, a water reservoir is a water container housed within the fluid mixture dispensing system. In other embodiments, the water reservoir may be a standard water outlet such as a faucet or water line that can be connected to the fluid mixture dispensing system to supply water to the system. In addition, water can be used as a solvent to dissolve various other ingredients to form the requested fluid mixture. In some embodiments, in response to receiving the request for a fluid mixture, the system (e.g., a controller of the system) can flow a predetermined amount of water from a water reservoir to at least one mixing channel to form an intermediate fluid mixture. The predetermined amount of water can be mixed with alcohol from an alcohol reservoir and/or ingredients (i.e., ingredient mixtures) from a plurality of ingredient reservoirs in the at least one mixing channel to form an intermediate mixture before flowing to the mixing chamber. In specific embodiments of the invention, the system can flow a predetermined amount of at least one solvent from at least one solvent reservoir to other parts of the system such as the mixing chamber. As such, the mixing chamber can be fluidly connected to a water reservoir.

The predetermined amount of the at least one solvent can be specific to the requested fluid mixture. In other words, the predetermined amounts of solvent(s) that is flowed to the mixing chamber whether it/they be directly flowed there or in an intermediate mixture or intermediate mixtures can correspond to the amount of solvent(s) in the predefined fluid mixture selected form the library of a predefined fluid mixtures. In some embodiments, the predetermined amounts of the at least one solvent can be flowed from the at least one solvent reservoir throughout the system via at least one pump.

In some embodiments, the fluid mixture dispensing system can include more than one solvent reservoir, for example a second solvent reservoir such as second solvent reservoir 108*b* illustrated in FIG. 2. The second solvent reservoir can be for the same or different solvent as the first solvent reservoir. In specific embodiments of the invention, the second solvent reservoir, such as 108*b*, can be an alcohol reservoir as illustrated in FIG. 2. In some embodiments, the fluid mixture dispensing system can include a plurality of alcohol reservoirs. The alcohol reservoir can supply alcohol to the fluid mixture to be dispensed. As stated above, the solvent reservoirs can include alcohol (e.g., ethanol), water, ethyl lactate, propylene glycol, and/or a wide variety of other alcohols and/or solvents and their various combinations. Alcohol in the alcohol reservoir can be an alcohol mixture. In some embodiments, the alcohol mixture can include the alcohol and water. For example, an alcohol can be an alcohol mixture of 10-100% alcohol by volume (0-90% water by volume).

In some embodiments, an alcohol reservoir(s) is an alcohol container(s) housed within the fluid mixture dispensing system. Besides supplying the alcohol to a fluid mixture, alcohol can also be used to dissolve various other ingredients to form an intermediate fluid mixture as part of the requested fluid mixture. Alcohol can also be used as a sanitizing agent for the system.

In some embodiments, in response to receiving the request for a fluid mixture, the system (e.g., a controller of the system) can flow a predetermined amount of alcohol from an alcohol reservoir to at least one mixing channel to form an intermediate fluid mixture. The predetermined amount of alcohol can be mixed with water from a water reservoir and/or ingredients form a plurality of ingredient reservoirs in the at least one mixing channel to form an intermediate mixture before flowing to the mixing chamber. In some embodiments, the water and alcohol can be mixed prior to entering the at least one mixing channel.

In some embodiments, in response to receiving a request for a fluid mixture, the system can flow a predetermined amount of alcohol from an alcohol reservoir to other parts of the system such as the mixing chamber and/or a dissolution chamber. As such, the mixing chamber can be fluidly connected to an alcohol reservoir and the alcohol reservoir can be fluidly connected to the at least one dissolution chamber which in turn can be fluidly connected to the mixing chamber.

The predetermined amounts of alcohol can be specific to the requested fluid mixture. In other words, the predetermined amounts of alcohol that is flowed to the mixing chamber whether it be directly flowed there or in an intermediate mixture or mixtures can correspond to the amount of alcohol in the predefined fluid mixture selected from the library of predefined fluid mixtures. For example, if a glass of Chardonnay is selected and the predefined formula for Chardonnay has 14% alcohol by volume, the system would flow predetermined amounts of ethanol to the mixing chamber to be incorporated such that the Chardonnay has 14% alcohol by volume in the final dispensed fluid mixture based on the volume of the other ingredients. In some embodiments, the predetermined amounts of alcohol can be flowed from an alcohol reservoir throughout the system via at least one pump. In some embodiments, the system (e.g., the controller) can be configured to monitor an amount of alcohol or other solvent and/or ingredients in an alcohol, solvent and/or ingredient reservoir.

Figure 3:
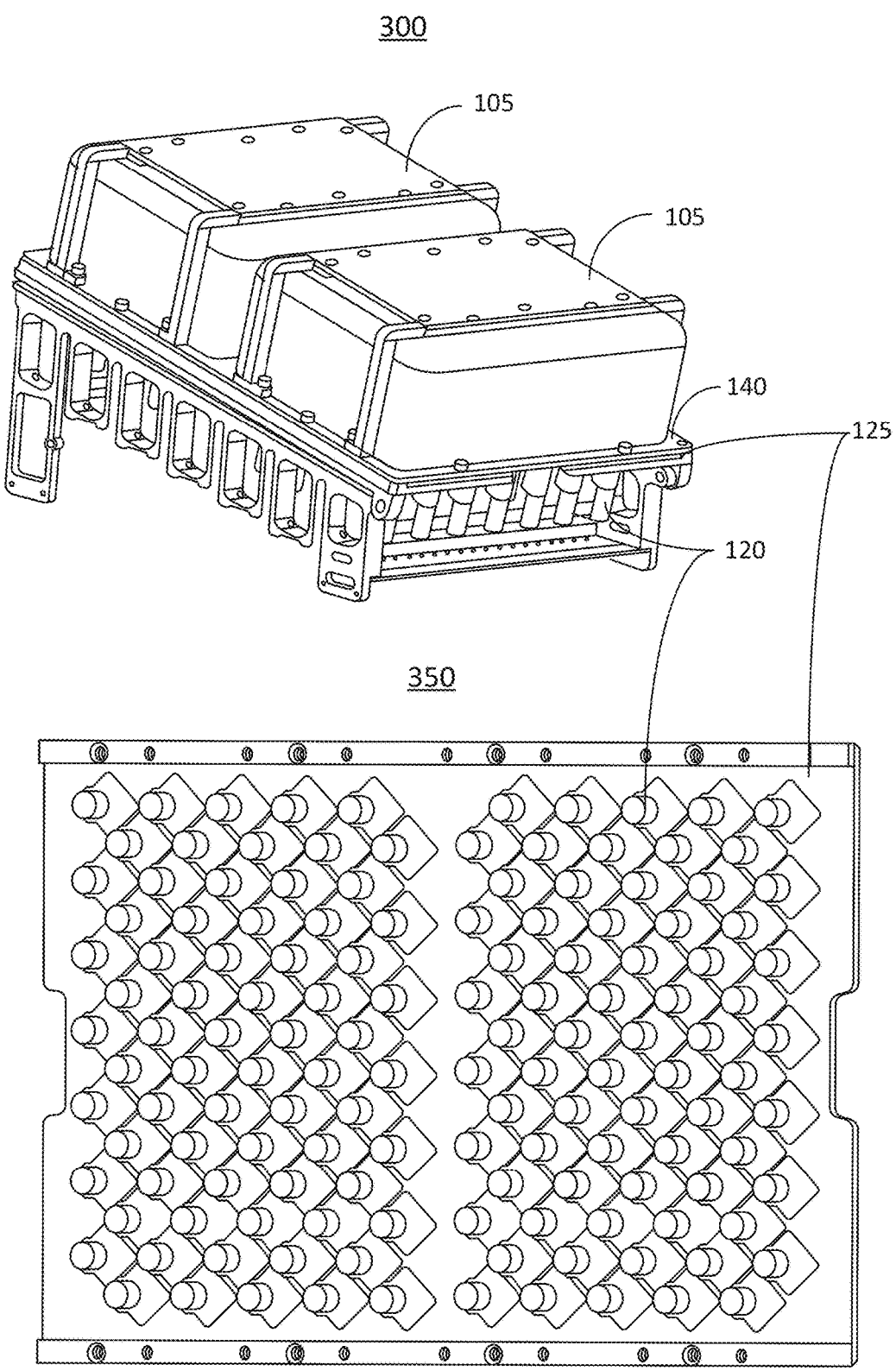
FIG. 3 illustrates a magnified view of part of an exemplary interface of an ingredient cartridges for the fluid mixture dispensing system, in accordance with some embodiments disclosed herein.

As explained before in this disclosure with reference to FIG. 2, ingredients from the ingredient reservoirs (e.g., 106) can be dispensed into the mixing area of device 100 (for example one or more mixing channels formed on plate 140) via a set of valves (e.g., valve 120). FIG. 3 includes a magnified view 300 of part of an exemplary interface of the ingredient cartridges 105 with the device 100, which includes the valves 120 and plate 140 (in which the mixing area/mixing channels can be formed, according to specific embodiment of the invention). FIG. 3 also includes an exemplary view 350 of a set of valves (e.g. valve 120) on the underside of a base plate 125 that can control ingredient dispensing from the set of ingredient reservoirs into the mixing channels of the fluid mixture dispensing system. In specific embodiments of the invention, the valves, such as valve 120, can be electromechanical valves. For example, the valves can be solenoid valves. The part of the valves visible in FIG. 3 can be solenoids that action an upper portion of the valves though the mixing area that can be formed on plate 140.

Figure 4:
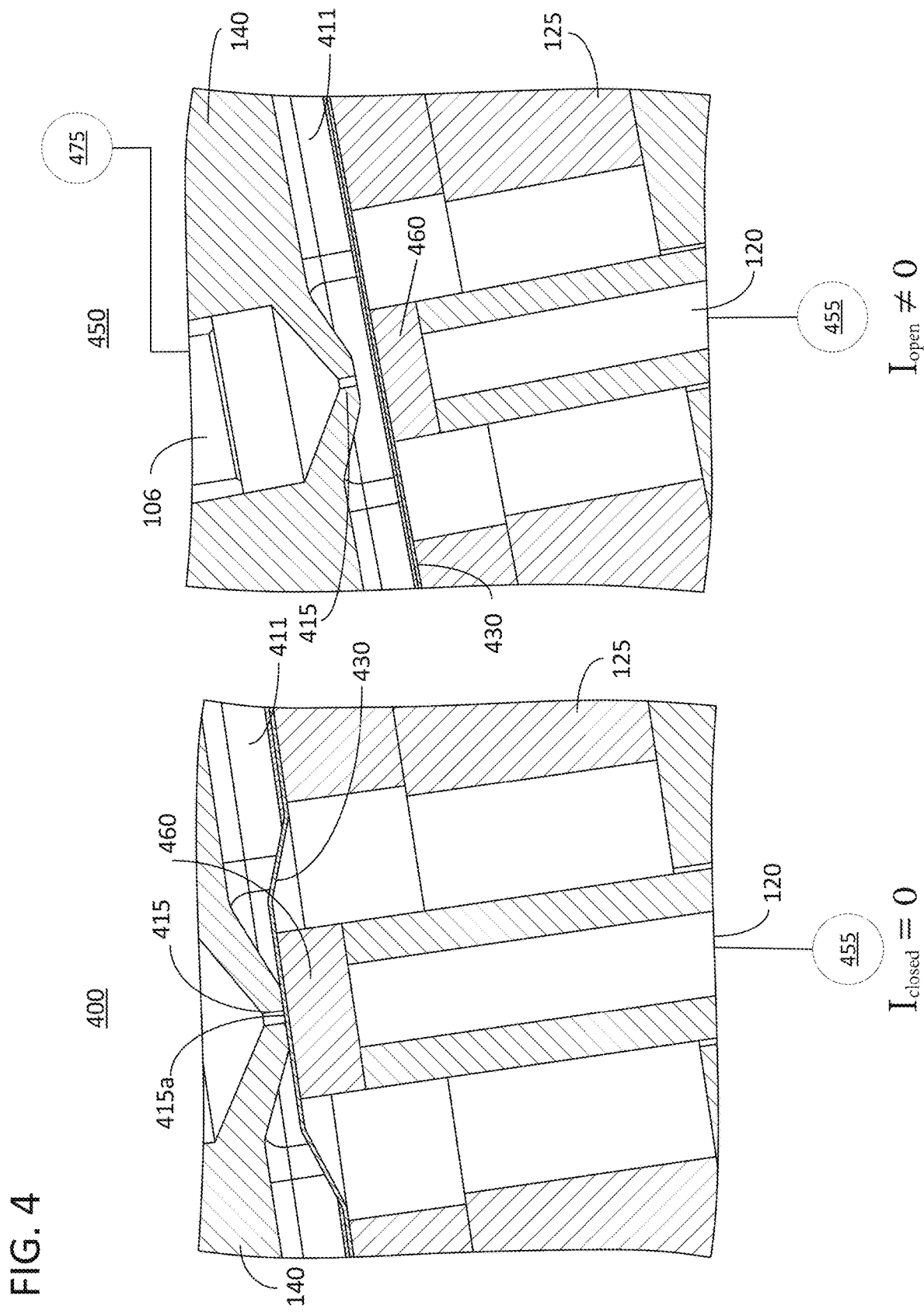
FIG. 4 illustrates a magnified view of an ingredient reservoir in a closed position and a view of an ingredient reservoir in an open position with respect to a mixing area, in accordance with some embodiments disclosed herein.

An example of the operation of the valves, such as valve 120, in accordance with the description above can be given with reference to FIG. 4. FIG. 4 includes a magnified view 400 of an ingredient reservoir in a closed position with respect to a mixing area including mixing channel 411, in accordance with some embodiments disclosed herein. View 450 illustrates a magnified view of an ingredient reservoir in an open position with respect to the mixing area including mixing channel 411, in accordance with some embodiments disclosed herein.

As described before in this disclosure, in some embodiments, the mixing area can include channels formed into the bottom of plate 140. In the example of FIG. 4, a mixing channel 411 is represented. The mixing channels can be fluidly connected to the solvent reservoir(s) and the mixing chamber. As such, solvent can enter at least one mixing channel (e.g., 411) and at least one ingredient from at least one ingredient reservoir (e.g., 106) can flow into the mixing channel to form an intermediate mixture with the solvent.

In specific embodiments of the invention and as illustrated in FIG. 4, each ingredient reservoir can open to an orifice 415. An actuator of the valve 120 can be positioned in a "closed" state or position as illustrated in view 400, in which no ingredient can flow from the ingredient reservoir 106 to the mixing channel 411. The actuator of the valve 120 can alternatively be positioned in an "open" state or position as illustrated in view 450 in which ingredient can flow from the ingredient reservoir 106 to the mixing channel 411.

In some embodiments, the ingredient reservoirs (e.g., 106) can connect to a membrane 430 with a flat plate orifice as its output. When a membrane 430 is forced against the orifice 415, no ingredient may flow out of the ingredient reservoir 106. For example, a compliant material 460 such as a rubber pad (e.g., a fluoroelastomer pad) can be pushed up against the membrane 430 such that the membrane closes an opening face 415a. The compliant material can be a material with a low set capability such that it can give a consistent even seal over time. The purpose of the compliant material can be to allow for misalignment of the actuator of valve 120 and still allow for a good seal of the valve seat/orifice. In other words, the compliant material can be such that it can be amenable to closing the orifice when it is pushed up against the membrane and valve. However, even when an ingredient reservoir 106 is in the closed position, any fluid/solvent such as water and/or alcohol can still flow through the mixing channel and around the closed ingredient reservoir orifice. When there is no force pushing the membrane 430 against the orifice opening, the ingredient can flow through the orifice to the mixing channel.

Orifice diameters can range from about 0.01-5 mm or about 0.05-1 mm depending on the physical flow characteristics of the ingredient stored in the particular ingredient reservoir. In specific embodiments of the invention, the diameter of the orifice can determine the flow rate through it for a given ingredient physical flow characteristic and cartridge/chamber pressure. In some embodiments, the valve and ingredient reservoir assembly can be interfaced with solenoids or other actuator below that are connected to a base plate 125, whose plungers can be pre-loaded against the membrane valves by springs or other force. In some embodiments, the plungers can be pre-loaded approximately at least or equal to about 1 N against the membrane valves by their springs. In some embodiments, the solenoid actuators' plungers can be biased with springs away from the solenoid coils such that they push with a controlled preload of force against the membrane valves.

In specific embodiments of the invention, switching a valve to/from a closed state (such as in view 400) from/to an open state (such as in view 450) requires energizing the valve. In other words, power may be needed to operate the actuators of valve 120 so that an ingredient from ingredient reservoir 106 can be dispensed to the mixing area, for example to mixing channel 411. In specific embodiments of the invention, the valves can be normally closed valves so that their de-energized state is a closed state (as in view 400) and, when energized, change their state to an open state (as in view 450). The opposite would also be possible but could imply a higher power consumption from the system as power would be needed to keep the valves closed. Either way, when the valves are energized, current flows through the valve creating an electromagnetic field that causes the actuator to move to the energized state (in the example of FIG. 4, to an open position).

In specific embodiments of the invention the current draw of the valves can be measured via a current sensor, such as sensor 455 represented in FIG. 4. The current sensor can be located inside the cartridge 105. In specific embodiments of the invention, the cartridge includes a printed circuit board, and the sensor can be located on the printed circuit board along with other components, such as a microprocessor. In alternative embodiments, the current sensor can be located on an interface of the cartridge and the device, the device could include a printed circuit board for controlling the cartridge valves, and the sensor could be located on the printed circuit board along with other components, such as a microprocessor. The current sensor can be configured to measure a current draw of one or more electromechanical valves by, for example, measuring a voltage across a resistor connected in series with the electromechanical actuator of the valve. In specific embodiments of the invention and as illustrated in FIG. 4, in a closed state such as in view 400, the current draw ($I_{closed}$) can be zero, when the valve is de-energized. In specific embodiments of the invention and as also illustrated in FIG. 4, in an open state such as in view 450, the current draw ($I_{open}$) can be different than zero, when the valve is energized. In this way, it can be possible to determine if a valve is open or closed by measuring the current via the current sensor 455. In specific embodiments of the invention, the time-based ingredient dispensing method mentioned before in this disclosure can use the measurements from sensors such as current sensor 455 to detect the status of the valve and therefore determine and/or control the time the valve is open for dispense.

The current measurements from current sensor 455 can be used for various purposes besides determining/controlling the state of the valves. In specific embodiments of the invention, evaluation of an actuator's magnetic reluctance when energized, can provide insights on whether a valve is performing as expected or not. In specific embodiments of the invention the current measurements from current sensor 455 can be used to detect an error. The error can be indicative of a malfunctioning or defective valve. The error can be a dispense error in that a malfunctioning or defective valve could not be dispensing the required amount of ingredient from ingredient reservoirs 106 to the mixing area 411.

An error can be detected based on the current measurements in various ways. For example, a controller of the system can sample the current draw measured by the sensor 455 and compare it to an expected value. An analog to digital converter can be connected to the current sensor in order to provide a digital representation of the current draw to the controller. Reference current values can be stored in a memory accessible to a controller of the system 100. For example, reference values for the expected current draw of an open valve ($I_{open}$) can be stored so that the controller can detect when a valve is not performing as expected by comparing the current values measured by the sensor 455 with the reference values stored in memory. An exemplary implementation of this feature could be, for example, when a valve is energized, and current is expected to flow through the valve. If the current value expected when a valve is open is a value other than zero, but the measurements from current sensor 455 indicate that no current is actually being detected, this can indicate that the valve is not working. In the same way, if the current value expected when a valve is open is a reference value "X" different than zero, and the measurements from current sensor 455 indicate that current is being detected but is different than the expected reference value "X", this can indicate that the valve is not working properly.

The reference value for the expected current can be stored in memory as part of a set of reference values that characterize a current profile of the valve. The current profile of the valve can be given for example, by a set of current values expected during a period of time, such as when a valve is being opened. As another example, the current profile could be given by a derivative of the current values expected at a given point of time. The set of reference values can therefore be in a reference curve, or one or more derivative values, which represents the current profile of the valve. The current values measured by the current sensor can be sampled by the controller and be independently compared to the corresponding expected current value in the set of reference values. The current values measured by the current sensor can be sampled by the controller and be mapped into a sampled current curve, so that the sampled curve can be compared with the reference curve to detect a change in the pattern of the curves. For example, a change in the slope of the sampled curve can be detected with respect to the slope of the reference curve, and this change can be indicative of a valve that is not performing as expected.

In specific embodiments of the invention the current measurements can be used to determine an error type. Determining error type can include detecting not only that the measured current value is different than the reference current value, but also assessing how different the values are and what the difference in values could represent. In the same way, determining the error type can include detecting not only that a measured current curve deviates from the reference current value, but also assessing how different the curves are and what the difference in the curves could represent. For example, the controller can be able to determine if the error is a potentially "false", "irrelevant" or "solvable" error, or to determine an error type based on a potential cause such as a stuck actuator of the valve.

In specific embodiments of the invention, the controller can be able to determine (for example by comparing the measured value(s)/curve) if the error is potentially a "false" or "irrelevant" error. The controller could make this determination, for example, if the difference between the measured value(s)/curve and the reference value(s)/curve is within an error tolerance level. In this way, the system can account for fluctuations in current that are not necessarily associated to a valve error, such as a slight change in temperature or power fluctuations due to other components of the system drawing current from the same power source that powers the valves. The system can be programmed to infer an error only when the difference between the measured value(s)/curve is bigger than an error tolerance value/curve. The error tolerance value/curve can be stored in memory accessible to the controller, so that the controller can access it to perform the error determination.

In specific embodiments of the invention, the controller can be able to determine (for example by comparing the measured value(s)/curve) if the error is a potentially "solvable" error. The controller could make this determination, for example, if the difference between the measured value(s)/curve and the reference value(s)/curve is below a critical threshold. If the difference is below the critical threshold, there may be a corrective action that can be performed to fix and/or compensate for the error. If the difference is above the critical threshold, other solution may be needed, such as replacing the defective valve. In specific embodiments of the invention, the controller can first determine if the difference is bigger than the error tolerance value (i.e., first determine that there is an error, in other words, that the error is not "false" or "irrelevant" as described before). Once this determination is made, the controller can then determine if the difference is smaller than the critical threshold to decide if a corrective action can be performed. The critical threshold value/curve can be stored in memory accessible to the controller, so that the controller can access it to perform the error determination.

A corrective action, as used above, refers to an action that can be taken by the system to solve or compensate for an error detected from the current measurements. The corrective action can include adjusting the dispense mode of the potentially defective valve. The dispense mode can be adjusted for example by changing the pressure in the ingredient reservoir so that the ingredients are under more/less pressure, which could impact the dispense speed. In this way, if a valve is not performing as expected, as indicated by the current measurements, the pressure in the reservoir can be adjusted accordingly so that the volume of ingredient dispensed is not affected by the malfunctioning of the valve. The dispense mode can be alternatively, or in combination, be adjusted by changing the time that the potentially defective valve is held open. In this way, if a valve is not performing as expected, as indicated by the current measurements, the dispense time (i.e., the time that the valve remains in an open position, such as in view 450 in FIG. 4, allowing ingredient to flow from ingredient reservoir 106 to mixing area 411) can be adjusted accordingly so that the volume of ingredient dispensed is not affected by the malfunctioning of the valve.

In specific embodiments of the invention, determining an error type can include determining the potential cause of the error such as a broken coil in the electromechanical valve. A potential cause of the error can be, for example, a stuck plunger in the valve, a presence of a contaminant in the valve, overheating of the electromechanical valve, and others. Each of those conditions can be associated with a given reference value/curve so that the controller can determine the potential cause of the error. For example, no current detected during the sensor measurements when a valve is open can indicate a broken coil, a measured current that is lower than an expected reference value, or that lacks a characteristic curve associated with a mechanical change in the shape of the coil as described below, can indicate a stuck plunger, measured current with an elongated characteristic curve can indicate a presence of a contaminant, or other condition, a measured current that is slowly dropping over time (i.e., multiple measurements of a single valve) can indicate overheating of the valve, etc. Generally, a pattern in deviation from a reference curve can indicate an error type. The corrective action described before in this disclosure can be performed, for example, in situations in which the error type is of a kind that can be compensated by taking such action. For example, a measured current which is lower than expected, which could imply that the valve is not dispensing the volume it was originally configured to dispense, can be compensated by increasing the dispense pressure and/or dispense time as explained before.

In specific embodiments of the invention, the controller actuates the valves (and/or other components of the system) to create a fluid mixture. The controller can decide which valves to actuate based on certain known information. For example, the controller can have knowledge of what ingredients, and in what volume, to dispense from the ingredient reservoirs to the mixing area for a given fluid mixture. The controller can obtain this knowledge either by calculations from other information available (such as mixture ratios for a given combination of ingredients, a user input, data available to the controller such as preferences for given users, etc.) or by receiving data on the ingredients and/or volume, for example from information stored in memory or from other systems, for example in the form of instructions to execute a recipe for the given mixture which can be acquired from a recipe server or the Internet. The controller can use the time-based dispense methods described before in this disclosure by translating the volume to be dispensed into dispense times for the valves or have knowledge (either by obtaining or calculating the information) of the dispense time for each valve. The controller can use this knowledge to control the valves accordingly. For example, the controller can use this knowledge to control the system to energize a valve to open it (change it from a closed state as in view 400 to an open state as in view 450), leave the valve open (as in view 450) during the dispense time, and close the valve after the dispense time has passed.

After the dispense time has passed, the measurements from the current sensors, such as sensor 455, can be used to assess the status of the valves as explained before in this disclosure. Because the controller can have knowledge about the specific valves that have been actuated, the controller can use the data measured by the sensor to make the error determinations described before. For example, if the controller knows that valve 120 in the set of valves illustrated in FIG. 2 was instructed to open for a certain dispense time, but the measurements from the current sensor indicate that no current draw for valve 120 was detected during the dispense time, the controller can use this information to infer that valve 120 is not working. In a similar way, if the controller knows that the valve 120 was instructed to be open for a certain dispense time, but the measurements from the sensor indicate that the current draw of the valve differs from that of a reference value, the controller can infer that the valve is malfunctioning or defective.

The approaches described above can be particularly relevant for embodiments in which more than one valve dispenses ingredients to a common channel for a giving mixture. If only one ingredient were necessary to prepare the fluid mixture, an assessment of the dispense status of a valve associated with such ingredient reservoir could be made by analyzing the resulting dispensed volume. If the volume did not match an expected volume, a dispense error could be inferred. However, in specific embodiments of the invention, a fluid mixture to be prepared by a fluid mixture device such as device 100 can involve a plurality of ingredients being dispensed from different ingredient reservoirs, and therefore involve a plurality of different valves operating for a single fluid mixture. At the same time, as described before in this disclosure, one or more solvents can also be mixed with the ingredients in the mixing area, for example in channel 411 illustrated in FIG. 4. If multiple valves dispense to a common channel it can be hard to determine which valve is malfunctioning by analyzing the resulting volume as a whole. If the resulting volume is not the expected volume, but more than two, and for example 80 valves were actuated, determining which valve is malfunctioning may not be an easy task. The use of the current sensors described in this disclosure to monitor the current draw of the valves during dispense can be a solution to this problem. Regardless of the total volume in the mixing channel, the current measurements can assess the actual profile of the individual valves and determine which one is malfunctioning and therefore producing the dispense error.

In specific embodiments of the invention, the device can include one or more additional sensors, such as sensor 475, to measure other parameters in the system. The values of those other parameters in the system can be compared with expected values based on the measured current. The system can be programed to detect a discrepancy between the values obtained by the different sensors. The system can be programmed to detect an error based on such difference. For example, an additional sensor, such as sensor 475, can be used to determine a volume dispensed from an ingredient reservoir. This dispensed volume value can then be compared against the expected volume value according to the current measurements from sensor 455. In specific embodiments of the invention, a discrepancy between those values can be detected. In specific embodiments of the invention, a discrepancy between those values can indicate an error in the measurements of one of the sensors 455 and/or 475. This method can be used as a double-check for the health of the sensors in the system, and/or as a method to detect dispense errors. While a sensor 475 is shown as measuring a property of an ingredient reservoir, the one or more additional sensors disclosed herein could alternatively be connected to measure properties of a fluid flow into which the ingredients are dispensed or that comprises the dispenses ingredients. For example, the fluid flow measurement could be obtained by a downstream or upstream volume, weight, or pressure sensor.

In specific embodiments of the invention, the additional one or more sensors, such as sensor 475, can be pressure sensors. As explained before in this disclosure, the ingredient reservoirs can be pressurized so that, when the valves are open, the pressure contributes to the dispense of the ingredient out of the ingredient reservoir. In this way, the volume of ingredient dispensed can depend on both the period of time that the valve is open and the pressure in the ingredient reservoir. In specific embodiments of the invention, a pressure sensor, such as sensor 475 can measure the pressure in the ingredient reservoir. The pressure measurements can then be used by a controller to determine changes in the volume in the ingredient reservoir, and/or the volume dispensed out of the ingredient reservoir. This determination can be made via calculations that involve both the pressure and the volume as operands, such as by using the ideal gas law. In specific embodiments of the invention, other factors can influence the volume determination, for example, the diameter of the orifices 415 of the ingredient reservoirs. In any case, a volume determined via additional methods (e.g., using pressure sensor 475) and a volume determined by the current measurements of sensor 455 can be compared and used in the determination of the health of the components of the system, such as the valves and/or the sensors themselves. The pressure sensors, other sensors used to measure the dispensed volume from an ingredient reservoir, and methods for determining the dispensed volumes from such sensors, can be any of the sensors and/or approaches disclosed in U.S. patent application Ser. No. 17/547,612 filed Dec. 10, 2021, which is incorporated by reference herein in its entirety for all purposes.

As described before in this disclosure, an ingredient cartridge comprising a set of ingredient reservoirs can be or include a unitary pressure chamber for more than one ingredient reservoir. In this case, a pressure variation inside the cartridge may not be an accurate determination of the contribution of a single valve to such pressure variation as more than one valve can dispense ingredients from the same cartridge. In a similar way, a determination of a total volume in the cartridge, or total volume dispensed, may not be an accurate determination of the volume dispensed by a single valve. The use of current sensors such as current sensor 455 can be advantageous in those situations. However, in these situations, an overall pressure and/or volume variation in the cartridge can be contrasted with the variations determined based on the measurements of the current sensors, and therefore it can be possible to determine which valve, if any, is causing a discrepancy.

In specific embodiments of the invention, each valve includes its own current sensor. In other specific embodiments of the invention, the valves can be grouped in subsets and only one current sensor per subset is provided. In specific embodiments of the invention, the subset of valves can include 8 valves, and one current sensor can be used for the 8 valves. In this way, if the device includes, for example, 88 ingredient dispense valves, the number of current sensors can be reduced from 88 (if each valve had its own sensor) to 10 (if only one sensor was provided for a subset of 8 valves). Any number of valves can be grouped in a subset. This can be a cost-effective solution in situations where many ingredient reservoirs are provided in the device. In specific embodiments of the invention, to maintain accuracy of the measurements, and so that the controller has knowledge of which valve is causing a dispense error, only one valve in a valve subset is actuated at a time. In this way, even if a single current sensor is used to measure current for the subset of valves, current can be measured individually for the valve being actuated at a given time. The controller can be configured to control the system so that the valves to dispense the ingredients necessary for a given fluid mixture are actuated in a manner such that only one valve in each subset is actuated at a time. In specific embodiments of the invention, the subset of valves is formed so that the same sensor measures current of valves that are not likely to be, or are never, open at the same time. For example, a sensor could measure current for a subset of valves associated to the same type of ingredient (e.g., if there are duplicate ingredients in a cartridge) or for a subset of valves associated to alternative ingredients which are not likely to be mixed together (such as different kinds of sweeteners, different kinds of flavors, etc.). In specific embodiments of the invention, a library of recipes of fluid mixtures can be known to a manufacturer of the device, and the current sensors can be placed so that they measure current of a subset of valves that are associated to ingredients that are not going to be dispensed together for any of the fluid mixtures in the library of fluid mixtures. These and other factors can be considered to measure current of more than one valve with a single sensor.

Figure 5:
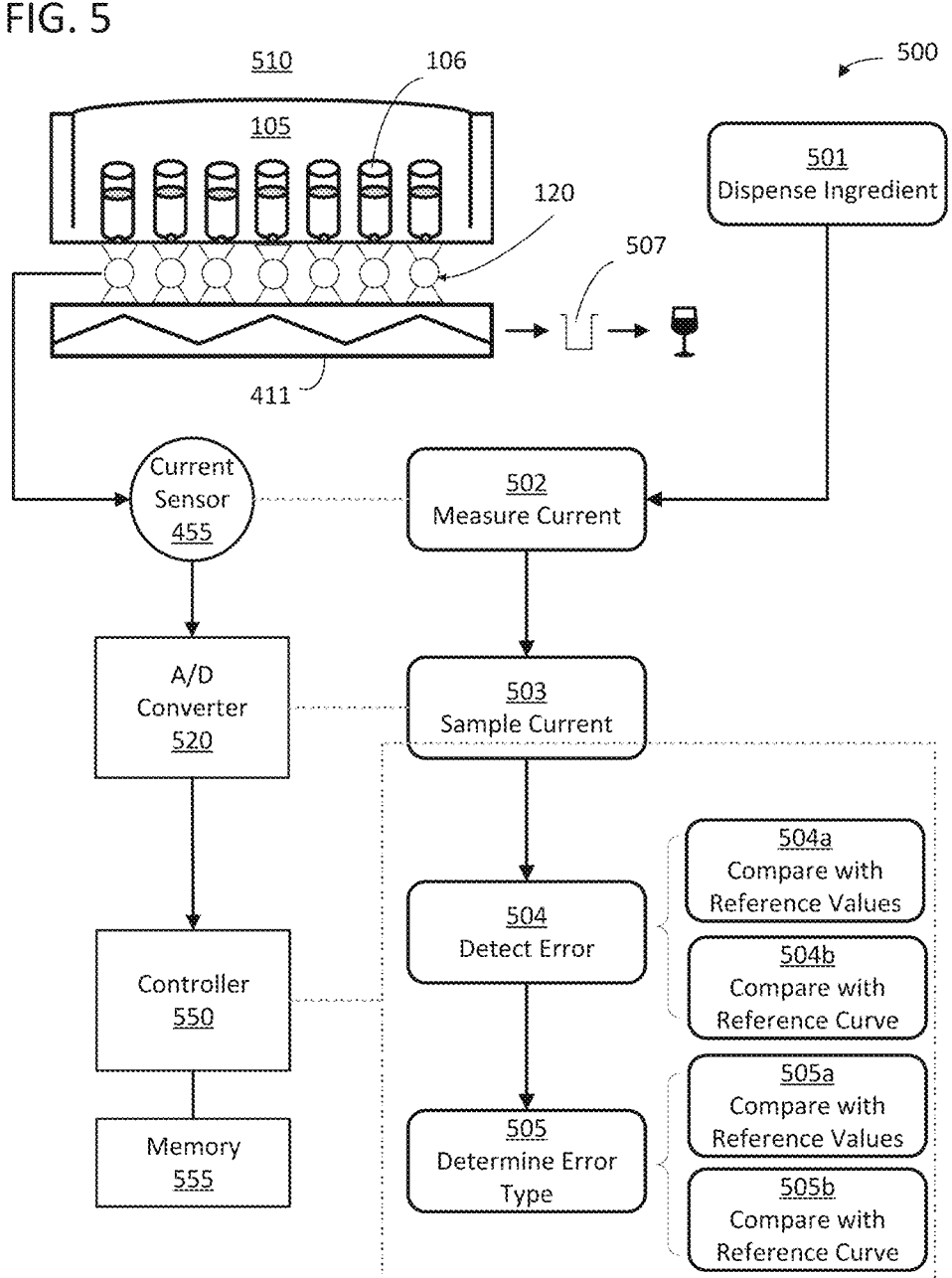
FIG. 5 illustrates a flowchart for a set of methods for a fluid mixture dispensing system and a schematic representation of some components of the system, in accordance with some embodiments disclosed herein.

FIG. 5 includes, to the right, a flowchart 500 for a set of methods for a fluid mixture dispensing device such as device 100 in accordance with the disclosure above. FIG. 5 also includes, to the left, a schematic representation 510 of some components of the system that can be involved in the different steps of the method. Representation 510 includes a cartridge 105 comprising a set of ingredient reservoirs such as ingredient reservoirs 106. The ingredient reservoirs are associated to a set of valves, such as valve 120, to dispense the ingredients from the reservoirs to the mixing area 411 when the valves are open. As described before in this disclosure, the mixture in mixing area 411 can be an intermediate mixture of one or more ingredients from ingredient reservoirs 106 and/or one or more solvents. Such intermediate mixture can flow out of the mixing area 411 to a mixing chamber 507 to be further mixed with other ingredients or intermediate mixtures and/or be dispensed out of the device.

Flowchart 500 starts with a step 501 of dispensing an ingredient. For example, dispensing an ingredient from ingredient reservoir 106 into the mixing area 411 via the valve 120. This step can include energizing the valve 120 to switch it from a closed state to an open state as described with reference to FIG. 4, holding the valve open for the dispense time, and switching the valve back to a closed state, de-energizing the valve. Flowchart 500 further includes a step 502 of measuring the current draw of the valve 120. As illustrated in representation 510, this step can be performed via a current sensor, such as current sensor 455. Step 502 can be performed independently of step 501. For example, the sensor could be constantly measuring the current draw of the valve regardless of the status of the valve. In specific embodiments of the invention, step 502 is performed while step 501 is performed, so that a current profile of the valve can be measured while the valve is energized/de-energized.

Flowchart 500 continues with a step 503 of sampling the current measurements. As illustrated in representation 510 and as previously explained in this disclosure, this step can be performed in part by a controller, such as controller 550, and in part by an analog to digital converter, such as analog to digital converter 520. This step can include sending, by the sensor, signals with the measured current values to the controller. This step can include receiving, by the controller, the signals with the current measurements. This step can include sampling a current signal from the current sensor to determine one or more point values, and/or building a current profile curve based on a plurality of point values or the measurement signals themselves. For example, a number of samples can be obtained in a window of time, and those samples can be used to solve for a slope for the curve. A subsequent number of samples can be obtained in a subsequent window of time, and so forth. The controller can have access to one or more memories such as memory 555, either locally or remotely, to store such measurements.

Flowchart 500 continues with a step 504 of detecting an error. As explained before in this disclosure, reference values and/or curves can be stored in a memory accessible to the controller, such as memory 555. The controller can detect an error by detecting a divergence between (for example by comparing) a measured value obtained in step 503 and a reference value stored in memory, as indicated by step 504a. Step 504a can include determining if the measured value is in a reference curve stored in memory. The controller can, additionally or in combination, detect an error by detecting a divergence between (for example by comparing) a measured curve obtained in step 503 and a reference curve stored in memory, as indicated by step 504b. As explained before in this disclosure, this can include detecting a change in a characteristic of the curve, such as the slope.

Flowchart 500 further includes a step 505 of determining an error type. This step can be similar to step 504 in that it can involve comparing the measured value with a reference value, as indicated by step 505a, and/or comparing a measured curve with a reference curve, as indicated by step 505b. However, while step 504 includes detecting an error based on a divergence, step 505 can include further analysis of the divergence between the values/curves. Step 505 can include determining if the divergence is within an error tolerance level (in which case it could be inferred, for example, that the error is "irrelevant" as defined before in this disclosure). Step 505 can also include determining if the divergence is smaller than a critical threshold (in which case it can be inferred, for example, that the error is "solvable", as defined before in this disclosure. Step 505 can also include determining a potential cause of the error, such as a stuck plunger error. These and other determinations can be made as part of step 505, for example via sub-steps 505a and 505b. Reference value(s)/curves for each of those conditions can be stored in memory so that the controller can make the determination. Alternatively, the controller can make such determinations based on reference value(s)/curves for standard behavior stored in memory, by determining how different the measured behavior is from the standard behavior stored in memory.

Step 505 could be followed by a step of performing a corrective action to solve for the error. For example, if it is determined that the error is "solvable", a subsequent step can include determining a solution, for example leave the valve open for a longer period of time and/or changing the pressure in cartridge 105 if it is determined that the valve plunger is potentially partially stuck.

Figure 6:
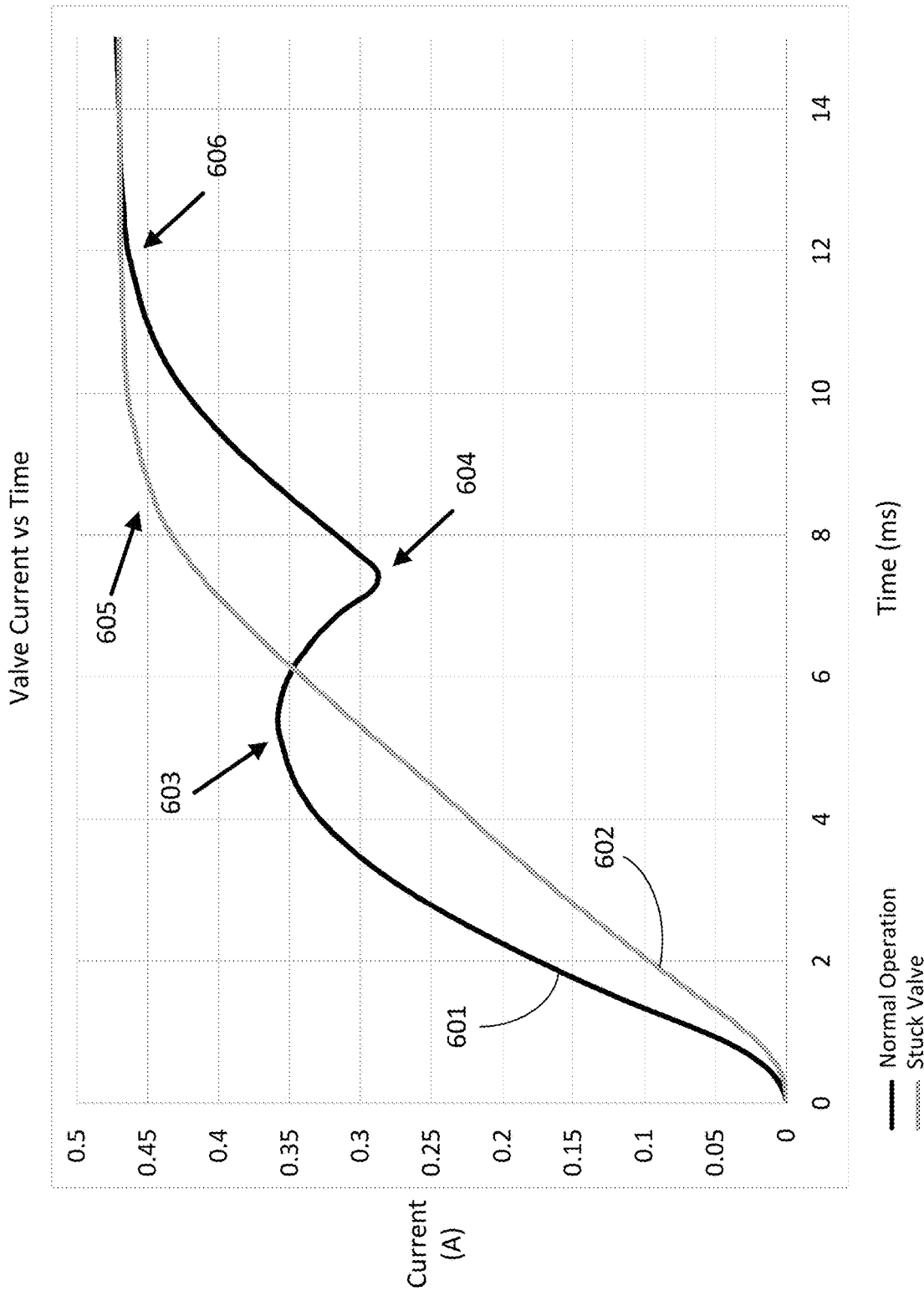
FIG. 6 illustrates an example of a reference current profile curve and a measured current profile curve for a valve with a stuck plunger, in accordance with some embodiments disclosed herein.

FIG. 6 illustrates an example of a graph 600 which includes an example of a reference curve 601 that could be stored in memory for the controller to make the detection in step 504 and/or the determination in step 505, and an example of a measured curve 602 for a valve with a stuck plunger. The reference curve could be stored in memory as a set of expected values for the measured curve (e.g., slope and/or y-axis values at specific times or in specific sequences). The curves represented in FIG. 6, and the values included therein, are for explicative purposes only and do not limit the scope of this invention. Curve 601 can be a reference curve, stored in memory and accessible to the controller.

The reference curve 601 can be used to characterize the current profile of a specific type of valve being used during normal operation. When a valve (such as an electromechanical valve, e.g., a DC solenoid) has voltage applied across it (for example when it is energized) the current profile can follow an exponential approach based on the L-R series nature of the circuit, as illustrated at the beginning of the curve 601 and up to around point 603. However, there can be a mechanical component (for example change in the geometry of the solenoid, which can be due a plunger of the valve moving to change the valve between the closed and open states) so that the circuit is not a purely L-R circuit. As the plunger of the valve moves, the magnetic flux and therefore inductance can increase. This can have the effect of lowering the current through the valve when it is moving, as shown between points 603 and 604. When the valve has reached its "end of travel" (i.e., the plunger has finished moving and/or hit frame-stop) the inductance can reach a maximum value (at around point 604) and be generally fixed thereafter. The final portion of curve 601, in which the current rises to point 606, is therefore caused by the current charging a pure L-R circuit as the mechanical component has ceased to impact the current. The "abrupt" change in slope at around points 603 and 604 can therefore be given by the plunger moving and then reaching its final position. As illustrated in the example of FIG. 6, the actuation time of the valve is of about 7.4 ms. This time can be different depending on the valves being used and/or other factors.

Measured curve 602, on the other hand, does not show the notable reversal in the sign of the slope that is characteristic of reference curve 601. The change in slope occurring at around point 603 and around point 604 in the reference curve 601 was not detected for the measured curve 602. Instead, measured curve 602 presents a characteristic pure L-R charging curve with a roll off at around point 605. This is because a stuck actuator may never change magnetic flux, nor inductance, and therefore may follow a characteristic pure L-R charging curve, as illustrated. This difference in measured vs expected slope can be used by the controller to determine that the current profile of the measured valve does not match the reference profile stored in memory, and therefore detect an error. For example, the reference curve could be stored as detected rapid changes in the slope of a given magnitude and any measured curve that did not exhibit a change in slope of sufficient magnitude could be identified as being associated with a defective valve. The controller can determine the type of error (e.g., stuck plunger) by effectively recognizing that the coil of the electromechanical valve has not moved. Other error types can be determined by the controller by detecting other variations in the curve. For example, a stuck plunger could result in no current bump in the measured curve as illustrated, a broken coil could result in a zero current measured, a contaminant can result in slower actuation time, overheating can result in the current slowly dropping over time, a broken coil with an open-circuit response could yield a flat slope, etc.

In the example of FIG. 6, the reference value can be stored as a difference between two slopes taken around 0.5 milliseconds apart. This reference value attempts to capture the non-linear transition of a plunger hitting frame-stop and are evaluated to look for a magnitude change. In other words, the system will check to see if the difference between such sampled slopes on the measured curve switches from negative to positive at any point (i.e., indicating a shift in the curve from a declining slope to an increasing slope). If the difference in sampled slopes exceeded a particular threshold, that can indicate that the plunger has bounced and it is indeed in motion. However, a stuck actuator, will yield a normal inductor-resistor response from coil windings, with a smooth continually decreasing slope, since the plunger is static and its effective inductance remains fixed.

A controller, as used in this disclosure for example with reference to controller 550, can include one or more processors that can be distributed locally within the system or remotely. For example, one or more components of the system, such as valves, pumps, and sensors can be associated to individual microcontrollers that can control their operations and interaction with other components of the system. In specific embodiments of the invention, the controller can be a control system for the overall device even if the various control elements are separately programmed and are not part of a common control hierarchy. The controller can have access to one or more memories that store the instructions for the controllers. The memories can also store information for the system, such as a library of recipes, reference values such as the pressure thresholds and/or target pressure values mentioned in this disclosure, and any other necessary information such as sensor data and the like.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method disclosed herein can be executed by a processor in combination with a computer readable media storing instructions for the methods in combination with the other hardware elements described above. These and other modifications and variations to the present invention may be practiced by those skilled in the art, without departing from the scope of the present invention, which is more particularly set forth in the appended claims.

What is claimed is:

1. An ingredient dispensing system comprising:
   an ingredient reservoir;
   an electromechanical valve configured so that, when the electromechanical valve is actuated, an ingredient is dispensed from the ingredient reservoir;
   a current sensor configured to measure a current draw of the electromechanical valve;
   a pressure sensor configured to measure a volume in the ingredient reservoir; and
   a controller configured to:
   sample the current draw from the current sensor and detect a dispense error of the electromechanical valve based on the sampled current draw;
   determine changes in the measured volume based on measurements of the pressure sensor; and
   determine a discrepancy between an expected volume based on the measured current draw and the volume measured by the pressure sensor.

2. The ingredient dispensing system of claim 1, wherein the electromechanical valve is a solenoid valve.

3. The ingredient dispensing system of claim 1, wherein the dispense error includes at least one of: a stuck plunger in the electromechanical valve; a broken coil in the electromechanical valve; a presence of a contaminant in the electromechanical valve; and overheating of the electromechanical valve.

4. The ingredient dispensing system of claim 1, wherein the controller is further configured to:
   determine, using the current draw measured by the current sensor, a time that the electromechanical valve is held open; and
   determine, based on the time, a volume of the ingredient that is dispensed by the electromechanical valve.

5. The ingredient dispensing system of claim 4, wherein:
   the ingredient is dispensed via an orifice of the ingredient reservoir; and
   the volume of the ingredient dispensed from the ingredient reservoir also depends on a diameter of the orifice.

6. The ingredient dispensing system of claim 1, wherein:
   the ingredient reservoir is pressurized with a pressure;
   the electromechanical valve, when actuated, is open for a period of time; and
   a volume of the ingredient dispensed from the ingredient reservoir depends on both the pressure and the period of time.

7. The ingredient dispensing system of claim 1, further comprising:
   a memory accessible to the controller storing a set of reference current values;
   wherein the controller detects the dispense error by comparing the sampled current draw with at least one of the reference current values in the set of reference current values stored in the memory.

8. The ingredient dispensing system of claim 7, wherein:
   the set of reference current values are in a reference curve;
   the sampled current draw defines a point on a sampled current curve; and
   the dispense error is detected by determining deviation of the sampled current curve from the reference curve.

9. The ingredient dispensing system of claim 7, wherein:
   the controller detects the dispense error based on the sampled current draw by:
   detecting a difference between the sampled current draw and a reference value.

10. The ingredient dispensing system of claim 9, wherein:
    the controller is configured to perform a corrective action to compensate for the dispense error.

11. The ingredient dispensing system of claim 10, wherein the corrective action includes adjusting a dispensing mode by at least one of: changing a pressure of the ingredient reservoir and changing a time that the electromechanical valve is held open.

12. The ingredient dispensing system of claim 7, wherein:
    the set of reference current values are in a reference curve;
    the sampled current draw defines a point on a sampled current curve; and
    the controller detects the dispense error by comparing a slope of the reference curve and a slope of the sampled current curve.

13. A method, conducted by an ingredient dispensing system, the method comprising:
    dispensing, by an electromechanical valve, an ingredient from an ingredient reservoir;
    measuring, using a current sensor, a current draw of the electromechanical valve;
    sampling, by a controller, the current draw from the current sensor; and
    detecting, by the controller, a dispense error of the electromechanical valve based on the sampled current draw;

wherein:
the controller detects the dispense error based on the sampled current draw by detecting a difference between the sampled current draw and a reference value;
the controller is configured to perform a corrective action to compensate for the dispense error; and
the corrective action includes adjusting a dispensing mode by at least one of: (i) changing a pressure of the ingredient reservoir; and (ii) changing a time that the electromechanical valve is held open.

14. The method of claim 13, wherein the electromechanical valve is a solenoid valve.

15. The method of claim 13, wherein the dispense error includes at least one of: a stuck plunger in the electromechanical valve; a broken coil in the electromechanical valve; a presence of a contaminant in the electromechanical valve; and overheating of the electromechanical valve.

16. The method of claim 13, further comprising:
measuring, using a sensor, a volume in the ingredient reservoir; and
determining, by the controller, a discrepancy between an expected volume based on the measured current draw and the measured volume from the sensor.

17. The method of claim 16, wherein:
the sensor is a pressure sensor; and
the controller is further configured to determine changes in the measured volume based on measurements of the pressure sensor.

18. The method of claim 17, further comprising:
remediating the dispense error according to one or more of the measured current draw and the changes in the measured volume.

19. The method of claim 13, further comprising:
determining, using the current draw measured by the current sensor, a time that the electromechanical valve is held open; and
determining, based on the time, a volume of the ingredient that is dispensed by the electromechanical valve.

20. The method of claim 13, wherein:
the ingredient reservoir is pressurized with a pressure;
the electromechanical valve, when actuated, is open for a period of time; and
a volume of the ingredient dispensed from the ingredient reservoir depends on both the pressure and the period of time.

21. The method of claim 20, wherein:
the electromechanical valve dispenses the ingredient via an orifice of the ingredient reservoir; and
the volume of the ingredient dispensed from the ingredient reservoir also depends on a diameter of the orifice.

22. The method of claim 13, further comprising:
storing, in a memory accessible to the controller, a set of reference current values; and
detecting the dispense error by comparing the sampled current draw with at least one of the reference current values in the set of reference current values stored in the memory.

23. The method of claim 22, wherein:
the set of reference current values are in a reference curve;
the sampled current draw defines a point on a sampled current curve; and
the dispense error is detected by detecting deviation of the sampled current curve from the reference curve.

24. The method of claim 22, wherein:
the set of reference current values are in a reference curve;
the sampled current draw defines a point on a sampled current curve; and
detecting the dispense error includes comparing a slope of the reference curve and a slope of the sampled current curve.

25. The ingredient dispensing system of claim 24, wherein:
the ingredient reservoir is pressurized with a pressure;
the electromechanical valve, when actuated, is open for a period of time; and
a volume of the ingredient dispensed from the ingredient reservoir depends on both the pressure and the period of time.

26. An ingredient dispensing system comprising:
an ingredient reservoir;
an electromechanical valve for the ingredient reservoir;
a current sensor configured to measure a current draw of the electromechanical valve;
a pressure sensor configured to measure a volume in the ingredient reservoir; and
a controller, wherein the controller is programmed to:
actuate the electromechanical valve to dispense an ingredient from the ingredient reservoir;
sample the current draw from the current sensor;
detect a dispense error of the electromechanical valve based on the sampled current draw; determine changes in the measured volume based on measurements of the pressure sensor; and
determine a discrepancy between an expected volume based on the measured current draw and the volume measured by the pressure sensor.

27. The ingredient dispensing system of claim 26, wherein:
the ingredient is dispensed via an orifice of the ingredient reservoir; and
the volume of the ingredient dispensed from the ingredient reservoir also depends on a diameter of the orifice.

28. An ingredient dispensing system comprising:
an ingredient reservoir;
an electromechanical valve configured so that, when the electromechanical valve is actuated, an ingredient is dispensed from the ingredient reservoir;
a current sensor configured to measure a current draw of the electromechanical valve; and
a controller configured to:
sample the current draw from the current sensor and detect a dispense error of the electromechanical valve based on the sampled current draw;
determine, using the current draw measured by the current sensor, a time that the electromechanical valve is held open; and
determine, based on the time, a volume of the ingredient that is dispensed by the electromechanical valve.

29. The ingredient dispensing system of claim 28, further comprising:
a sensor configured to measure a volume in the ingredient reservoir;
wherein the controller is further configured to determine a discrepancy between an expected volume based on the measured current draw and the volume measured by the sensor.

30. The ingredient dispensing system of claim 29, wherein:
the sensor is a pressure sensor; and
the controller is further configured to determine changes in the measured volume based on measurements of the pressure sensor.

31. The ingredient dispensing system of claim 30, wherein the controller is further configured to:

remediate the dispense error according to one or more of the measured current draw and the changes in the measured volume.

32. An ingredient dispensing system comprising:

an ingredient reservoir;

an electromechanical valve configured so that, when the electromechanical valve is actuated, an ingredient is dispensed from the ingredient reservoir;

a current sensor configured to measure a current draw of the electromechanical valve; and a controller configured to:

sample the current draw from the current sensor and detect a dispense error of the electromechanical valve based on the sampled current draw;

wherein:

the controller detects the dispense error based on the sampled current draw by detecting a difference between the sampled current draw and a reference value;

the controller is configured to perform a corrective action to compensate for the dispense error; and the corrective action includes adjusting a dispensing mode by at least one of: (i) changing a pressure of the ingredient reservoir; and (ii) changing a time that the electromechanical valve is held open.

* * * * *